(12) United States Patent
Plank

(10) Patent No.: US 8,790,735 B2
(45) Date of Patent: *Jul. 29, 2014

(54) METHOD OF PREFERENTIALLY REDUCING ABSORPTION OF SATURATED FAT AND COMPOSITIONS

(75) Inventor: David W. Plank, Taylors Falls, MN (US)

(73) Assignee: General Mills, Inc., Minneapolis, MN (US)

( * ) Notice: Subject to any disclaimer, the term of this patent is extended or adjusted under 35 U.S.C. 154(b) by 1598 days.

This patent is subject to a terminal disclaimer.

(21) Appl. No.: 12/096,643

(22) PCT Filed: Dec. 14, 2006

(86) PCT No.: PCT/US2006/062099
§ 371 (c)(1),
(2), (4) Date: Jun. 9, 2008

(87) PCT Pub. No.: WO2007/073543
PCT Pub. Date: Jun. 28, 2007

(65) Prior Publication Data
US 2009/0252854 A1 Oct. 8, 2009

Related U.S. Application Data

(60) Provisional application No. 60/753,451, filed on Dec. 22, 2005.

(51) Int. Cl.
*A23D 9/007* (2006.01)

(52) U.S. Cl.
USPC ............ 426/601; 426/606; 426/607; 426/804

(58) Field of Classification Search
USPC .................. 426/607, 601, 606, 804
See application file for complete search history.

(56) References Cited

U.S. PATENT DOCUMENTS

| | | | | |
|---|---|---|---|---|
| 5,304,546 A | * | 4/1994 | Comini et al. | 552/545 |
| 6,890,549 B2 | * | 5/2005 | Artiss et al. | 424/439 |
| 7,547,459 B2 | * | 6/2009 | Plank et al. | 426/601 |
| 7,736,684 B2 | * | 6/2010 | Plank et al. | 426/607 |
| 2003/0232068 A1 | | 12/2003 | Lewandowski et al. | |
| 2004/0116382 A1 | | 6/2004 | Plank et al. | |
| 2004/0120984 A1 | * | 6/2004 | Artiss et al. | 424/439 |
| 2005/0019375 A1 | | 1/2005 | Artisa et al. | |
| 2005/0019475 A1 | | 1/2005 | Plank et al. | |
| 2005/0025875 A1 | | 2/2005 | Plank et al. | |
| 2006/0019021 A1 | | 1/2006 | Plank et al. | |
| 2009/0252854 A1 | * | 10/2009 | Plank | 426/613 |

OTHER PUBLICATIONS

Watt, B. and Merrill, A. 1975. Composition of Foods. USDA, Washington, DC, p. 124, 126, 127, 130, 131.*
Reeves, 1997, *Components of the AIN-93 Diets as Improvements in the AIN-76A Diet*, 838S-841S.

* cited by examiner

*Primary Examiner* — Carolyn Paden
(74) *Attorney, Agent, or Firm* — Dale A. Bjorkman

(57) ABSTRACT

Methods and food product compositions are provided for preferentially reducing absorption of saturated fat whereby the effective caloric content of a fat-containing food product is reduced by about 25% of the effective caloric content contributed by a saturated fat. This food product is prepared with a major portion of the saturated fat present in the food product being complexed with a solubilized alpha and/or beta cyclodextrin. Food products comprising a fat component comprising mixtures of saturated and unsaturated fat fractions are provided wherein the saturated fat fraction is desirably selectively more complexed to reduce its relative metabolic availability.

17 Claims, 3 Drawing Sheets

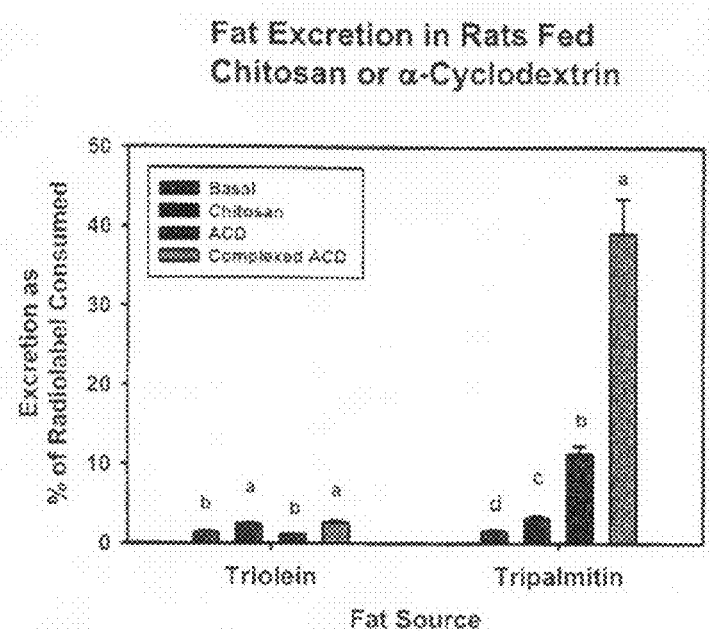

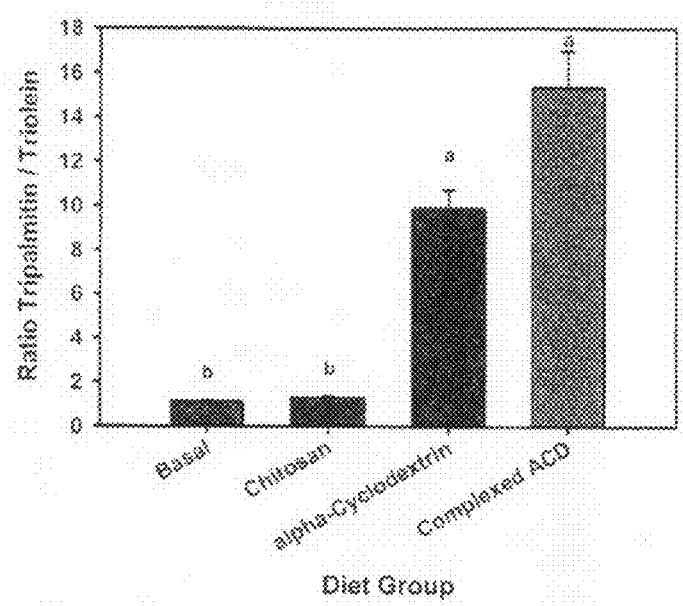

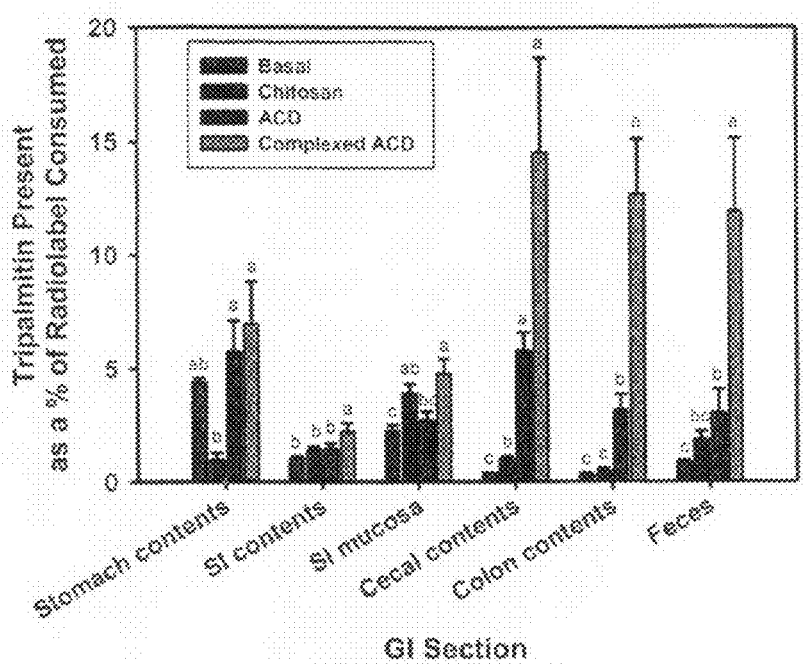

METHOD OF PREFERENTIALLY REDUCING ABSORPTION OF SATURATED FAT AND COMPOSITIONS

PRIORITY CLAIM

The present patent application is a National Stage of International Application No. PCT/US2006/062099, filed on Dec. 14, 2006, and having a PCT Publication No. WO2007/073543, wherein all prior patent applications are commonly owned by the owner of the present patent application and wherein the entire contents of said application are incorporated herein by reference for all purposes.

FIELD OF THE INVENTION

The invention relates to fat-containing compositions. More specifically, the invention relates to fat-containing compositions having saturated fats that are preferentially bound by alpha and/or beta cyclodextrin.

BACKGROUND OF THE INVENTION

Fats are compounds that provide a highly concentrated source of energy in food products. Fats are combinations of saturated and unsaturated fatty acids. Although fats are essential for functioning of the body, they also are a major contributor of calories in the modern diet that in many cases leads to people becoming overweight or even obese.

Saturated fats are fats that are typically found in animal products and in some vegetable oils, such as coconut, palm and palm kernel oils, and are a cause of increase in low density lipoprotein (LDL), the so-called "bad" cholesterol. Unsaturated fats are considered to be more "healthy," because they tend to lower blood cholesterol. Trans fatty acids are unsaturated fatty acids in which the hydrogens of a double bond (or unsaturation) are on opposite sides of the molecule. The trans isomer of the fatty acid causes the carbon chain to assume a straight-chain configuration similar to that of a saturated fat. Trans fatty acids are primarily formed through the metal-catalyzed process of hydrogenation, however they have also been found to form naturally at low levels in cow's milk. By hydrogenating oils through industrial processing, hydrogen atoms are added to unsaturated sites on fatty acids, creating a larger population of saturated fats in the oil. In a partially-hydrogenated oil, some of the unsaturated fatty acids remain. However, the processing causes some of the double-bonds of the unsaturated fatty acids to undergo isomerization to the trans configuration.

Cyclodextrins comprise a doughnut shaped or cyclical structure composed of a number of alpha-D-glucose units (typically 6-8) having a hydrophilic exterior and a hydrophobic interior. Cyclodextrins are generally water soluble, although alpha-cyclodextrin is likely more water soluble than beta-cyclodextrin or gamma-cyclodextrin, and free flowing crystalline powders that are substantially if not completely odorless and white in color. Cyclodextrins have been used principally for the encapsulation of insoluble compounds on a molecular basis in order to enhance stability, reduce volatility and alter solubility as well as to increase shelf life of certain products. Such prior uses of cyclodextrins have been limited to flavor carriers and protection of sensitive substances against thermal decomposition, oxidation and degradation. In addition, more recently, cyclodextrins have also been used to remove fatty acids and cholesterol from animal fats and to remove cholesterol and cholesterol esters from egg yolks. In such uses, it is believed that the compound to be encapsulated by the cyclodextrin is associated on a molecular basis with the interior of the cyclodextrin doughnut shaped or cyclical structure.

Fat compositions have been thickened by binding the fat with cyclodextrin by mixing the fat with a cyclodextrin that has been solubilized by a solvent, preferably water. This process is described in U.S. patent application Ser. No. 11/158,747; Titled: VISCOUS FAT COMPOSITIONS HAVING LOW AMOUNTS OF TRANS-FAT, METHODS AND PRODUCTS, filed Jun. 22, 2005.

Food products and methods have been described wherein the bioavailability of fat in a food product is reduced by ingesting alpha-cyclodextrin in an appropriate amount with a fat-containing meal, or shortly before or after ingesting a fat-containing meal. See US Patent Application Publication 2005/0019375 at paragraph 0028. (This application claims priority to the same provisional application as WO 2004/016101.) Alternatively it is taught that the alpha-cyclodextrin may be combined with the food product prior to consumption. The application goes on to state that a method is described for complexing comprising fat with alpha-cyclodextrin. This method is described as simply "determining the amount of fat that a subject desires to absorb per meal or per day, determining the amount of ingested fat that in excess of the amount that the subject desires to absorb, and then ingesting sufficient amounts of alpha.-cyclodextrin to complex the excess fat such that only the desired amount of fat is absorbed." See paragraph 0054. The alpha-cyclodextrin is administered in any format, as discussed in paragraph 0067, or by substituting for a different dry ingredient in a food product, as discussed in paragraph 0068.

While it is possible to use various techniques to reduce the relative fat content of foods, such as by using fat replacement materials like fiber, the organoleptic properties of low fat foods often do not satisfy the expectations on consumers.

SUMMARY OF THE INVENTION

It would be desirable to reduce the effective caloric content of a fat-containing food product by a technique other than simply replacing fat with a less organoleptically effective material. Further, it is desirable to reduce the amount of saturated fat that is metabolized by the body. Where both saturated fat and unsaturated fat are present in a food product, it is desirable to reduce the amount of saturated fat metabolized by the body relative to metabolism of unsaturated fat by the body. The present invention provides unique methods for accomplishing reduction of metabolization of fats, and particularly of saturated fats, by the body.

In a first aspect of the present invention, a method is provided for reducing the effective caloric content of a fat-containing food product. In this method, a food product is identified wherein at least about 25% of the effective caloric content of the food product is contributed by a saturated fat. This food product is then prepared wherein a major portion of the saturated fat present in the food product has been complexed with a solubilized alpha and/or beta cyclodextrin. It has surprisingly been found that saturated fats complexed in this manner are not effectively metabolized by mammals, but are nevertheless available to provide desired organoleptic properties.

While not being bound by theory, it is believed that saturated fats in particular are strongly associated with solubilized alpha and/or beta cyclodextrins. Once the saturated fats are complexed in this manner, they tend to remain complexed and are not metabolized by the mammalian digestive system. Further, it has been surprisingly found that saturated fat is complexed with alpha and/or beta cyclodextrins in an amount far exceeding the weight ratios that one might expect using conventional molecular sequestering theories. Thus, a very small amount of solubilized alpha and/or beta cyclodextrins has been found to be effective in complexing much larger amounts of saturated fat in particular. Thus, effective reduction of metabolism of saturated fat has been achieved in particular wherein the weight ratio of alpha and/or beta cyclodextrin to saturated fat is from about 1:100 to about 10:100.

It is important to note that the fat components or the food products of the present invention still contain the saturated fats, albeit in a complexed state. Because the fat is complexed with hydrated alpha and/or beta cyclodextrin, it is not metabolized by the body. For purposes of the present invention, the term "effective caloric content" is to be distinguished from the caloric content of fat or a food product that would be calculated from additive caloric content of separate ingredients, or by experimental measurement techniques that would not account for the inability of the body to metabolize the complexed fat (such as by bomb calorimetry or a like technique).

In another aspect of the present invention, a method is provided for selectively reducing the amount of saturated fat capable of being metabolized by the body relative to unsaturated fat in a fat-containing food product. Thus, even though the organoleptic properties of the saturated fat are not substantially diminished, the metabolism of the saturated fat by the body can be greatly diminished through complexation with solubilized alpha and/or beta cyclodextrin. It has been discovered that solubilized alpha and/or beta cyclodextrin preferentially complexes saturated fat as compared to unsaturated fat. In a fat composition containing both saturated fat and unsaturated fat, upon mixture with solubilized alpha and/or beta cyclodextrin, the saturated fat will be complexed more quickly. This allows for a major portion or all of the "bad" saturated fat to be complexed so that it is not capable of being metabolized by the body, while leaving a major portion or all of the "good" unsaturated fat in an uncomplexed state so that it is capable of being metabolized by the body. In this method, a food product is identified wherein the total fat content comprises at least about 30% saturated fat component and an unsaturated fat. The food product is then prepared, wherein a major portion of the saturated fat present in the food product has been complexed with a solubilized alpha and/or beta cyclodextrin.

The present invention additionally contemplates providing fat composition comprising saturated fat and unsaturated fat wherein the amount of saturated fat capable of being metabolized by the body is reduced. Such a composition would be suitable as a food product itself, or as a fat intermediate composition for incorporation with other food intermediates to form a final food product. Such a fat composition would comprise at least about 30% saturated fat component and additionally an unsaturated fat component, wherein a major portion of the saturated fat present in the fat composition is complexed with a solubilized alpha and/or beta cyclodextrin and a major portion of the unsaturated fat present in the food product has not been complexed with a solubilized alpha and/or beta cyclodextrin. In an embodiment of this aspect of the present invention, substantially none of the unsaturated fat present in the food product has been complexed with a solubilized alpha and/or beta cyclodextrin.

A method of preparing a fat composition comprising saturated fat and unsaturated fat wherein the amount of saturated fat capable of being metabolized by the body is reduced also contemplated. In this method, a fat composition comprising at least about 30% saturated fat component, and additionally comprising an unsaturated fat component is provided. A cyclodextrin composition comprising solubilized alpha and/or beta cyclodextrin is also provided. The fat composition and the cyclodextrin composition are mixed to preferentially complex a major portion of the saturated fat present in the fat composition with a solubilized alpha and/or beta cyclodextrin.

BRIEF DESCRIPTION OF THE DRAWINGS

FIG. 1 is a graph showing fat excretion in rats fed chitosan or alpha cyclodextrin.

FIG. 2 is a graph showing the ratio of excretion of radiolabeled tripalmitin to triolein in a rat study.

FIG. 3 is a graph showing the proportion of radiolabeled tripalmitin in each section of the gastrointestinal tract in a rat study.

DETAILED DESCRIPTION

The invention provides in one embodiment a significant benefit in reducing the effective caloric content of a fat-containing food product by identifying a food product wherein at least about 25% of the effective caloric content is contributed by a saturated fat; and complexing a major portion of the saturated fat component with a solubilized alpha and/or beta cyclodextrin. Because it has been found that saturated fats can be preferentially complexed by solubilized alpha and/or beta cyclodextrin, the resulting food product is efficiently reduced in caloric content. Selection of the food product to have at least about 25% of the effective caloric content is desirable in order to provide enough available saturated fat based caloric content in the food product to give a significant overall reduction in caloric content when a major portion of that caloric content contributor is complexed. The requirement that this caloric content is provided by saturated fat has been determined because of the efficiency of complexation of this category of fat, and also the desirability of prevention of metabolism of this particular category of fat.

For purposes of the present invention, a "major portion" of the saturated fat is deemed to be complexed if at least about 5% of the available saturated fat is complexed. More preferably, at least about 25%, and most preferably at least about 50% of the available saturated fat is complexed.

Examples of fats and oils with high saturated fatty acid contents to be included and complexed in the fat compositions and food products of the present invention include, but are not limited to, palm oil, palm kernel oil, coconut oil, lard, tallow, hydrogenated oils, and derivative fractions. Additionally, fats and oils that are enriched for saturated fatty acid content through breeding, genetic modification, interesterification, transesterification, fractionation and any other means would also function as substrates to be complexed and included in the fat compositions and food products of the present invention. Mixtures of different fats are also contemplated.

Examples of fats and oils that are low in saturated fatty acid content and are, therefore, not as efficacious when included and complexed in the fat compositions and food products of the present invention include corn oil, cottonseed oil, safflower oil, soybean oil, sunflower oil, canola oil, olive oil, and fish oil.

The cyclodextrin as used in the present invention is selected from alpha-cyclodextrin, beta-cyclodextrin, or mixtures thereof. Cyclodextrins comprise a doughnut shaped or cyclical structure composed of a number of alpha-D-glucose units (typically 6-8) having a hydrophilic exterior and a hydrophobic interior. Cyclodextrins are generally water soluble, although alpha-cyclodextrin is likely more water soluble than beta-cyclodextrin, and are free flowing crystalline powders that are substantially if not completely odorless and white in color.

In one embodiment of the invention, at least a portion and preferably substantially all the cyclodextrin is alpha-cyclodextrin. Alpha-cyclodextrin is a cyclized ring of six alpha 1,4 linked glucose units. Alpha-cyclodextrin has a cavity dimension of about 0.50×0.79 (nm). The solubility of alpha-cyclodextrin in water is good and at 25° C. is about 14 (gm/100 mL). In contrast, the native solubility of cyclodextrins in fats is poor. A useful alpha-cyclodextrin is commercially available in the United States from Wacker Specialties, Adrian, Mich. 49221 and sold under the trademark CAVAMAX® W6 Wacker-Chemie, Burghausen, Germany.

In another embodiment of the invention, alpha-cyclodextrin is used in combination or synergistically with beta-cyclodextrin, in particular ratios dependent upon the requirements of the ultimate user. In an exemplary embodiment, alpha-cyclodextrin can be used individually or can be combined with between 0.1 to about 40% by weight beta-cyclodextrin. Beta-cyclodextrin is also available from Wacker Specialties, Adrian, Mich., USA, 49221.

In one embodiment, the cyclodextrins can be prepared by the use of enzymes. Enzymatic degradation or treatment of the starch to produce cyclodextrins useful in the present invention is done through the use of cyclodextrin glucosyltransferase (CGTase, EC 2.4.1.19) or other enzymes, which results in a cyclic ring of sugar. In one method, cyclodextrins are produced by the action of cyclodextrin glucosyltransferase on hydrolyzed starch syrups at neutral pH (6.0-7.0) and moderate temperature (35-40° C.). Alternatively, cyclodextrins can be produced in planta by the expression of the gene encoding CGTase in the food plant of interest.

The thus provided cyclodextrin is solubilized in solvent, and then a fat component is mixed with the solvent-solubilized cyclodextrin to form a fat/cyclodextrin/solvent mixture. Preferably, the solvent is water, in which case the cyclodextrin is commonly referred to as a hydrated cyclodextrin rather than a solubilized cyclodextrin.

In one method of complexing the fat with solubilized cyclodextrin, the fat/cyclodextrin/solvent mixture formed by mixing fat with solubilized cyclodextrin is separated into separate portions, wherein at least one portion is a fat/cyclodextrin composition comprising fat that has been complexed with cyclodextrin. In this fat/cyclodextrin composition, at least about 25% of the cyclodextrin is bound to the fat. The fat/cyclodextrin composition is then segregated from the remaining portions of the fat/cyclodextrin/solvent mixture.

In an alternative method of complexing the fat with solubilized cyclodextrin, a cyclodextrin is solubilized in a solvent. The solubilized cyclodextrin is added to a fat at an addition rate that is sufficiently slow and with sufficient agitation to provide a fat/cyclodextrin composition comprising fat that has been complexed with cyclodextrin. At least about 25% of the cyclodextrin in the fat/cyclodextrin composition is bound to the fat.

Yet another a method of complexing the fat with solubilized cyclodextrin comprises first solubilizing a cyclodextrin in a solvent and also providing a fat composition. The fat composition is mixed with the solubilized cyclodextrin to form a fat/cyclodextrin/solvent mixture comprising a fat/cyclodextrin complex. The temperature difference between the fat composition and the solubilized cyclodextrin at the initial time of mixing is less than or equal to about 15° C. This methodology produces both superior manufacturing efficiency and additionally can provide more consistent and better performing fat products. The above described methods wherein the fat/cyclodextrin/solvent mixture is separated into separate portions or the solubilized cyclodextrin is added to a fat at an addition rate that is sufficiently slow and with sufficient agitation to provide a fat/cyclodextrin composition comprising fat that has been complexed with cyclodextrin also benefit from carrying out the initial mixing of the fat composition and the solubilized cyclodextrin at a temperature difference is less than or equal to about 15° C.

In embodiments of the present invention, at least about 50% of the cyclodextrin in the composition is bound to the fat. In additional embodiments of the invention, at least about 75%, or at least about 90% of the cyclodextrin in the composition is bound to the fat. In additional embodiments, the food product is substantially free of free cyclodextrin. Having little or no free cyclodextrin is beneficial in food products of the present invention to prevent undesired sequestering of components such as flavorants in the food product. Additionally, it may be desirable to minimize the presence of uncomplexed cyclodextrin if a product is to be heated in order to prevent flavor loss or unwanted cyclodextrin residue after heating.

Turning now to a more detailed description of formation of the cyclodextrin/fat complex, a cyclodextrin is first solubilized in solvent. Generally, the cyclodextrin is added to solvent in an amount up to the solubility of the cyclodextrin in the solvent at the temperature of mixing. The solvent used for solvation of the cyclodextrin can be any solvent suitable for processing of the particular product to be prepared. For example the solvent desirably is safely consumable without adverse health concerns, or is readily removed from the product prior to consumption. Examples of particularly suitable solvents include water, alcohol, and mixtures of water and alcohol. Examples of alcohols particularly desired for use in the present invention include an edible alcohol such as non denatured ethanol or mixtures of water and ethanol. In additional embodiments, the water is at least deionized water and is preferably distilled water. Thus, at room temperature a typical process will include adding and mixing cyclodextrin to water in an amount of about 14% cyclodextrin by weight. In an embodiment that provides excellent performance results, the cyclodextrin is solubilized in solvent at a cyclodextrin:solvent mix ratio of from about 0.01:1 to about 5:1 by weight, respectively.

Fat is then mixed with the cyclodextrin-water mixture preferably in liquid form (e.g., added at a temperature above its melting point) and preferably with vigorous agitation for durations sufficient to form a slurry of cyclodextrin at least partially complexed with the fat ingredient.

In one embodiment, this mixture can be caused to separate into separate portions especially involving mechanical separation, wherein one portion is a fat/cyclodextrin composition comprising fat that has been complexed with cyclodextrin. The separation step can include any appropriate technique, such as churning, centrifuging, hydrocyclone processing, decanting, and the like. At least about 25% of the cyclodextrin in this fat/cyclodextrin composition is bound to the fat. The fat/cyclodextrin composition is segregated from the remaining portions of the fat/cyclodextrin/solvent mixture. The preparation method can be practiced at any suitable temperature, including temperatures ranging from about 5° C. to about 100° C. at atmospheric pressure. As noted above, in an embodiment of the invention, the solubilized cyclodextrin is mixed with the fat composition when the fat is in the form of a liquid above its melting point to facilitate the formation of the cyclodextrin fat complex.

In an embodiment of the invention, the fat/cyclodextrin/solvent mixture is separated by centrifuging the mixture for a time and at a speed sufficient to separate the mixture into portions that are segregatable layers. This centrifuging operation can be carried out at any appropriate temperature. In one embodiment, the centrifuging operation is carried out at a temperature of about 5 to 25° C.

The segregatable layers can be characterized in any way appropriate to identify the desired portion for the particular use of the ultimate fat composition. For example, the fat/cyclodextrin/solvent mixture can be separated into at least first, second and third portions based upon density. In this embodiment, the first portion or lightest or least dense portion can be a fat/cyclodextrin composition comprising fat that has been complexed with cyclodextrin, wherein at least about 25% of the cyclodextrin in the fat/cyclodextrin composition is bound to the fat, the first portion having a density less than 1 g/ml. The second portion can be a more dense aqueous phase containing solubilized cyclodextrin. The third portion or heaviest portion can be a fat/cyclodextrin composition comprising fat that has been complexed with cyclodextrin, the third portion having a density greater than 1 g/ml. In this embodiment, the first and third portions can find particular utility in various food products, where the removal of the second portion in this process assures that a low level of unbound cyclodextrin is present in the ultimate food product. Previous compositions comprising both cyclodextrin and fat did not contemplate removal of uncomplexed cyclodextrin as provided herein.

The desired layer for use in various products can be segregated from the other layers in any appropriate manner, such as decanting, pumping or draining. For example in the three layer embodiment as discussed above, material can be removed from the top layer to segregate the first portion. Alternatively, material can be removed from the middle layer to remove the second portion, with optional subsequent mixing of the top and bottom layer to provide a composition that is a mixture of the first and third portions. Alternatively, material can be removed from the bottom layer to segregate the third portion. Optionally, the second portion, which comprises unbound cyclodextrin, can be reused in subsequent processes to provide high efficiency use of available raw materials.

In a method of forming a fat/cyclodextrin complex, the method additionally comprises the step of removing solvent from the fat/cyclodextrin composition to an amount of less than about 20%, 10% or 5% by weight of the total fat/cyclodextrin composition. In other embodiments, substantially all moisture is removed from the fat (i.e., to provide a moisture content of less than 1%). Removal of solvent can be carried out by any appropriate drying technique process, such as spray drying, paddle drying, drum drying, freeze drying, or evaporation of solvent by bulk heating.

In another method of forming a fat/cyclodextrin complex, cyclodextrin is solubilized in a solvent, and the solubilized cyclodextrin is added to a fat at an addition rate that is sufficiently slow and with sufficient agitation to provide a fat/cyclodextrin composition comprising fat that has been complexed with cyclodextrin. At least about 25% of the cyclodextrin in the fat/cyclodextrin composition is bound to the fat.

As above, the solvent used for salvation of the cyclodextrin can be any solvent suitable for processing of the particular product to be prepared. For example the solvent desirably is safely consumable without adverse health concerns, or is readily removed from the product prior to consumption. Examples of particularly suitable solvents include water, alcohol, and mixtures of water and alcohol. The cyclodextrin can be provided in any desired weight ratio relative to the solvent. Examples of desired weight ratios include from about 1:10 to about 10:1, or from about 5:1 to about 1:5, or from about 2:1 to about 1:2 of cyclodextrin to solvent.

In a method of forming a fat/cyclodextrin complex, the addition of the solubilized cyclodextrin to the fat can be carried out at a temperature of from about 4° C. to about 95° C., and in another embodiment from about 30° C. to about 80° C. It is contemplated that the addition of the solubilized cyclodextrin to the fat can be carried out under an inert atmosphere, such as nitrogen. Either the solubilized cyclodextrin and/or the fat additionally optionally can comprise an emulsifier, such as palm distilled monoglycerides.

In embodiments of the present invention, the resulting fat/cyclodextrin composition can comprise up to about 40%, of solvent (and particularly water) by weight. In other embodiments, the resulting fat/cyclodextrin composition can comprise less than about 20%, or 10%, or 5% of solvent (and particularly water) by weight. Advantageously, this method facilitates achievement of a low solvent content as a function of the total fat/cyclodextrin composition by optionally limiting the amount of solvent that is added to the fat in the first place. Alternatively, excess solvent may be added, and subsequently removed by solvent removal processes as discussed above. This method of manufacture thus can provide substantial benefit in reduction of costs that would otherwise be incurred in the solvent removal process, and in providing a simple manufacturing process that does not necessitate investment in capital equipment such as centrifuges and the like for manufacture of the desired fat/cyclodextrin composition.

In one embodiment, the temperature of the fat composition is greater than or equal to the temperature of the solubilized cyclodextrin at the time of mixing. The method can in one embodiment be carried out wherein the fat composition is a fat from only one source and contains substantially no additional fats. Alternatively, the method can be carried out wherein the fat composition comprises a mixture of fats.

In one embodiment, the present method contemplates mixing a second fat composition with the a/cyclodextrin/solvent mixture after formation of the first fat/cyclodextrin complex. In this embodiment, the second fat composition is not complexed with cyclodextrin. In another embodiment, the present method contemplates carrying out a separate fat complexation process with a second fat composition. In other words, providing a second fat composition and mixing the second fat composition with the solubilized cyclodextrin to form a second fat/cyclodextrin/solvent mixture comprising a second fat/cyclodextrin complex, wherein the temperature difference between the second fat composition and the solubilized cyclodextrin at the time of mixing is less than or equal to about 15° C. Subsequently, the first fat/cyclodextrin complex is mixed with the second fat/cyclodextrin complex. This embodiment finds particular benefit where it is desirable to complex both fats in a fax mixture, but the rate of complexation of the two fats with cyclodextrin is sufficiently different that one fat would be complexed more than the other if it was attempted to complex both in the same reaction vessel.

It has additionally been determined that it is advantageous to carry out the mixing step of the fat composition and the solubilized cyclodextrin and then to hold the composition for a period of at least about 30 minutes.

In an embodiment of a method of forming a fat/cyclodextrin complex, the ratio of cyclodextrin to first fat composition is about 1-5% by weight. In another embodiment, the solubilized cyclodextrin is added to the first fat composition in sequential additions. The amount of the solubilized cyclodextrin to be added to the fat composition can be precalculated. In an alternative embodiment, it is noted that variations in material behavior and appropriate mix ratios may come about due to different material source or handling factors, and that a preset calculation may not be as accurate or uniform as desired. An advantageous alternative embodiment of the present invention therefore is to determine the amount of the solubilized cyclodextrin to be added to the fat composition by in-process measurement of viscosity of the fat/cyclodextrin/solvent mixture until a predetermined target viscosity is reached.

In all embodiments, an advantageous embodiment of the method of forming a fat/cyclodextrin complex provides that the solubilized cyclodextrin is added to the first fat composition under shear mixing conditions.

Food products can advantageously be formulated using fat compositions as described herein, wherein cyclodextrin is bound to the fat. Reduced amount of unbound cyclodextrin in intimate contact with fat is particularly advantageous, as noted above, in reduction of the generation of undesirable cyclodextrin residues. It is specifically contemplated that food products can additionally comprise cyclodextrin that is not bound to fat, and additionally is not in intimate contact with fat as a separate additive to the food product. For example, cyclodextrin that is not bound to fat and not in intimate contact with fat can be added as a component of encapsulated flavorants, for sequestering of bile acids as taught in U.S. patent application Ser. No. 10/172,471, filed Jun. 14, 2002, titled "FOOD PRODUCT HAVING INCREASED BILE ACID BINDING CAPACITY," LEWANDOWSKI ET AL; for reduction of generation of acrylamides in food products as taught in U.S. patent application Ser. No. 10/630,489, filed Jun. 22, 2003, titled "TREATMENT COMPOSITION FOR REDUCING ACRYLAMIDE IN FOOD PRODUCTS AND FOOD INTERMEDIATES," PLANK ET AL; or for reduction of cholesterol as taught in U.S. patent application Ser. No. 10/318,445 Filed Dec. 13, 2002, titled "FOOD PRODUCTS CONTAINING CYCLODEXTRINS HAVING BENEFICIAL HYPOCHOLESTEROLEMIC EFFECTS AND METHOD OF MAKING AND COMMUNICATING THE BENEFIT OF SUCH PRODUCTS," PLANK ET AL.

The fats can be emulsified or stabilized with mono- or diglycerides or other emulsifiers known in the art. Examples of emulsifiers include fully hydrogenated soybean oil mono-, di-, or tri-glyceride; mono-, di-, or tri-stearate, sodium stearyl-2-lactylate, and mixtures thereof.

Additionally, the fat/cyclodextrin composition can comprise adjuvants such as colorants, flavorants, texture modifiers, preservatives, stabilizers, and the like, designed to improve the taste, appearance and nutritional properties of the finished products. If present, each such adjuvant ingredient can in one embodiment of the invention be present in an amount ranging from about 0.01% to about 5% of the fat component.

Additionally, the resulting cyclodextrin fat complex can exhibit enhanced resistance to oxidation of the fat as compared to uncomplexed fats, thereby prolonging useful storage life of the fat composition or food products containing the composition with diminished observance of rancidity of the fat.

Methods of using these food products comprising heating these food products by the non-manufacturing consumer are additionally provided. In such methods, the consumer can realize the benefit of having a convenient product having a fat composition with the desired viscosity and cooking behavior, while simultaneously having low levels of saturated fat capable of being metabolized by the body.

The method of the present invention finds particular benefit in the use of fat/cyclodextrin complexes in food products and food intermediates that are traditionally high in saturated fats. Examples of such food products include microwave popcorn, ice cream, yogurt, pudding, peanut butter, meat products, (in particular meat emulsions such as franks, salami, bologna, and the like), margarine, butter, and food products containing one or more of these food products as food intermediates.

An example of a food product includes laminated dough products. Other examples of food products included biscuits, croissants, crescent rolls, cookies, cereals and cereal based products (particularly ready to eat ("R-T-E") cereals i.e. grain or vegetable based products in the form of flakes, extruded shapes or puffed, and optionally containing fruits and/or nuts or other such ingredients, such as corn flakes, puffed wheat, puffed rice, raisin bran flakes, and the like), cakes, snack bars, cereal bars, granola bars, bread products (such as loaf breads, rolls, and buns), and the like. Another example of a food product is a tablespread, such as butter or margarine, and in particular flavored spreads.

The fat can be used as an ingredient or phase of a food product. For example, a fondant composition comprising the fat and sugars (e.g., powdered sugar) can be used as a topical ingredient or a food phase (e.g., as a crème center to baked cookie wafers or other cookies or to a granola bar) or as a coating or icing for a variety of finished baked goods. The fondant can be the center of a filled candy or chocolate such as truffles. If desired, the fondant can also be aerated. In other food use applications, the fat can be employed as an ingredient in a fat and oil, e.g., a peanut butter whose oil ingredient does not separate even though non-hydrogenated.

In other variations, the fat can be saponified with an alkali such as sodium or potassium hydroxide to make a thickened vegetable oil soap.

In still other variations, the fats can be used as an ingredients in various emulsions whether water-in-oil ("w/o") or oil-in-water ("o/w") in food applications.

In an embodiment of the invention, the food product is provided as a packaged food product, either in bulk, in multiple servings (i.e. from about 2 to about 20 servings) or as single serving. The thus packaged food product can be provided in the cooked state, or the uncooked state. Examples of such food products include those that are packaged for heating by a non-manufacturing consumer. The physical and organoleptic properties of the fat-containing composition as described herein can provide particular benefit in such food products due to their shelf stability, excellent performance under a variety of environmental conditions. One particular example of a food product finding benefit of the present invention is related to products that are packaged for microwave heating.

Thus, the present invention provides a method of using the food product wherein the food product is packaged for subsequent heating of the food product by a non-manufacturing consumer. For purposes of the present invention, a "non-manufacturing consumer" is a party that does not assemble the raw ingredients of the food product, but instead can undertake one or more subsequent food preparation operations such as subdividing the food product into smaller portions and heating and optionally applying auxiliary ingredients such as sauces and the like to the food product. Examples of such non-manufacturing consumers include institutional food providers such as school cafeterias and hospitals and the like, and restaurants and the like. A sub-group of the non-manufacturing consumer is the retail customer, who is the individual party purchasing the food product for non-commercial use, such as feeding the family in the home. In an embodiment of the invention, the food product is provided as a packaged food product, either in bulk, in multiple servings (i.e. from about 2 to about 20 servings) or as single serving.

In one embodiment, this packaging is for microwave heating of the food product by a non-manufacturing consumer. In a specific example of this embodiment, the food product is packaged in a package suitable for placement in a microwave oven. In a more specific example, the package is designed to assist in cooking of the food product in a microwave oven.

The present fat ingredients find particular suitability for use in connection with human consumer food products. The skilled artisan will appreciate that growing understanding of the dietary needs animals indicates that the invention also can find suitability for use in connection with animal food product products, especially for common companion animals such as dogs and domestic cats.

The invention will further be described by reference to the following nonlimiting examples.

EXAMPLES

Test Protocols

A. Determination of Complexation of Available Saturated Fat.

As noted above, saturated fat is deemed to be complexed if at least about 5% of the available saturated fat is complexed. The amount of fat that is complexed is determined by conducting excretion studies as detailed below, and determining the amount of fat that is excreted as compared to a control sample not containing complexed fat. While some of the complexed fat may dissociate in the body, the excretion study will identify the minimum percentage of fat that is complexed.

B. Determination of Alpha-Cyclodextrin in Fat-Containing Food Products

Solution A:
  0.1 M acetic acid
  0.7% (w/w) KCl
  99.3% ddH$_2$0
Solution B: 2:1 Chloroform:Methanol
Reagent 1: Glyceryl triheptadecanoate (Sigma Prod # T2151-1G)
HPLC System:
  Column: Superdex Peptide 10/300 GL (Amersham Biosciences)
  Flow Rate: 0.5 ml/min
  Buffer A: 100 mM KH$_2$PO$_4$, pH 6.9 filtered and degassed.
  Monitors: UV/v is diode array 215 nm (Beckman-Coulter, Model 168, Fullerton, Calif. 92835)
    Refractive Index detector (HP Model 1047A, Agilent Technologies Palo Alto, Calif. 94303 USA)
  Pump: Beckman-Coulter Model 126, (Beckman-Coulter, Fullerton, Calif. 92835))
  Autosampler: Beckman-Coulter Model 508 (Beckman-Coulter, Fullerton, Calif. 92835)
  Data analysis: Beckman 32 karat, (Beckman-Coulter, Fullerton, Calif. 92835)
Gas Chromatography System:
  Gas Chromatograph Agilent Model HP 6890 GC System
  Column: Agilent Model 122-2362, J&W Scientific DB-23 Durobond FS02 Capillary Column 60 m×0.25 mm. Film thickness: 0.25 um
    Mode: Constant Flow; Initial Flow: 2.1 mL/min
    Nominal initial pressure: 32.71 psi
    Average velocity: 33 cm/sec
  Inlet:
    Mode: Split
    Initial temperature: 250° C.
    Pressure: 32.70 psi
    Split ratio: 50:1
    Split flow: 104.9 mL/min
    Total flow: 108.6 mL/min
    Gas Type: Helium
  Flame Ionization Detector:
    Temperature: 260° C.
    Hydrogen flow: 40.0 mL/min
    Air flow: 450 mL/min
    Mode: Constant makeup flow
    Makeup flow: 45.0 mL/min
    Makeup gas type: Helium
  Oven:

| Initial Temp: 50 C. | Max Temp: 280 C. |
| Initial Time: 1.00 min | Equilibration time: 0 min |

| Ramps: | | | |
| --- | --- | --- | --- |
| # | Rate | Final Temp | Final Time |
| 1 | 25.00 | 175 | 0.00 |
| 2 | 4.00 | 230 | 5.00 |
| 3 | 10.00 | 250 | 10.00 |
| 4 | 0.0 (off) | | |

Post temp: 100 C.
Post time: 0.00 min
Runtime: 36.75 min

Data analysis:
GC Chemstation A.10.01, Agilent Technologies, Inc., 5301 Stevens Creek Boulevard, Santa Clara, Calif., USA 95051

Method 1A

Macro Method for Foods and Fats with Non-Ionizable Triglycerides

1. Weigh out 1.000 gram of food sample to each of two clean 250 ml glass screw cap Erlenmeyer flasks with phenolic foil lined caps ("Flask") and record weight.
2. Add Reagent 1, Glyceryl triheptadecanoate, (1.0 mg) to the Flask.

Determination of Unbound Alpha-Cyclodextrin

3. Add 20.0 ml of ddH$_2$O.
4. Heat Sample at 25° C. for 60 minutes with sonication.
5. Cool sample to room temperature.
6. Centrifuge one aqueous sample at 5000×g. Use the other aqueous sample as described in 10 below.
7. Filter 1 ml of the centrifuged sample supernatant with 0.45 micrometer nylon filter. Inject on to HPLC molecular sizing column.
8. Take 10 ml of sample from 6 above and concentrate by roto-evaporator to 1 ml (record exact volumes). Filter with 0.45 micrometer nylon filter. Inject on to HPLC molecular sizing column.
9. For Pure Fat Samples Only: Weigh remainder of supernatant sample into tared flask. Evaporate moisture to dryness. Record weight of solids. (note: net weight for non-salt containing fat samples will represent free alpha-cyclodextrin)

Extraction of Fat and Determination of Total Alpha-Cyclodextrin

10. Add 10 ml of 2:1 Chloroform:MeOH to $2^{nd}$ flask 20 ml Vial. Seal cap tightly. Incubate at 95° C. for 1 hour with constant shaking at 250 rpm.
11. Focus organic and aqueous phase by centrifuging for 10 min at 5000 rpm separating the organic phase from the aqueous phase.
12. Withdraw bottom layer (chloroform:MeOH) from the flask avoiding the aqueous layer during the draw. Transfer to a clean flask and dry down and treat as in 13 below.

Determination of Total Fat by Gas Chromatography

13. Resolubilize dried organic phase sample from 12 above with appropriate amount of chloroform (0.5 to 0.9 ml). Transesterify using Alltech MethPrep II (Alltech Associates, Inc., Deerfield, Ill. 60015, USA) or sodium methoxide. Alternatively, saponify samples.
14. Silanate samples (optional for glycerol and sterol determination) and inject on to GC with FID detector or Mass Spec detector (Hewlett Packard Model 5970 MSD; Agilent Technologies Palo Alto, Calif. 94303 USA) to quantify or determine the amount fat or level of sterol related compounds that are found in sample.

Determination of Total (Bound+Unbound) Alpha-Cyclodextrin

15. Centrifuge the isolated aqueous layer from 12 above at 5000×g.
16. Filter 1 ml of the centrifuged sample supernatant with 0.45 micrometer nylon filter. Inject on to HPLC molecular sizing column. Quantify total cyclodextrin relative to a response factor developed from a standard curve of pure cylcodextrin.
17. For Pure Fat Samples Only: Weigh remainder of supernatant sample into tared flask. Evaporate moisture to dryness. Record weight of solids. (note: net weight for non-salt containing fat samples will represent free alpha-cyclodextrin)
18. Subtract free alpha-cyclodextrin amounts determined in 7 and 8 above from values determined in steps 18 and 19, respectively. Value equals total bound alpha-cyclodextrin.

Method 2A

Micro Method for Foods and Fats with Non-Ionizable Triglycerides

1. Weigh out 0.1000 gram of sample each into two clean 20 ml glass scintillation vial with phenolic foil lined cap ("Vial") and record weight.
2. Add Reagent 1, Glyceryl triheptadecanoate, (0.1 mg) Weigh out 0.1000 gram of sample into each Vial.

Extraction of Unbound Alpha-Cyclodextrin

3. Add 2.0 ml of $ddH_2O$.
4. Heat Samples at 25° C. for 60 minutes with sonication.
5. Cool sample to room temperature.
6. Centrifuge one aqueous sample at 5000×g. Use the other aqueous sample as described in 8 below.
7. Filter 1 ml of the centrifuged sample supernatant with 0.45 micrometer nylon filter. Inject on to HPLC molecular sizing column. Determine quantity of alpha-cyclodextrin by integrating peak at approximately 32 minute retention time. Quantify total cyclodextrin relative to a response factor developed from a standard curve of pure cyclodextrin. (Note: The retention time will vary depending on volume of HPLC system. The retention time for a given system should be determined by calibration using a standard of pure cyclodextrin)

Extraction of Fat and Bound Alpha-Cyclodextrin

8. Add 10.0 ml of 2:1 Chloroform:MeOH. Seal cap tightly. Incubate at 95° C. for 1 hour with constant shaking at 250 rpm.
9. Focus organic and aqueous phase by centrifuging for 10 min at 5000 rpm separating the organic phase from the aqueous phase.
10. Withdraw bottom layer (chloroform:MeOH) from the vial with a 10 ml gas tight syringe. Avoiding the aqueous layer during the draw. Transfer to a clean flask and dry down.
11. Resolubilize sample from 10 above with appropriate amount of chloroform (0.5 to 0.9 ml). Transesterify using Alltech MethPrep II (Alltech Associates, Inc., Deerfield, Ill. 60015, USA) or sodium methoxide. Alternatively, saponify samples.
12. Silanate samples (optional for glycerol and sterol determination) and inject on to GC with FID detector or Mass Spec detector (Hewlett Packard Model 5970 MSD; Agilent Technologies Palo Alto, Calif. 94303 USA) to quantify or determine the amount or level of sterol related compounds that are found in sample.

Determination of Total (Bound+Unbound) Alpha-Cyclodextrin

13. Centrifuge the isolated aqueous layer from 10 above at 5000×g for 10 min.
14. Filter 1 ml of the centrifuged sample supernatant with 0.45 micrometer nylon filter. Inject on to HPLC molecular sizing column. Quantify total cyclodextrin relative to a response factor developed from a standard curve of pure cylcodextrin.
15. For Pure Fat Samples Only: Weigh remainder of supernatant sample into tared flask. Evaporate moisture to dryness. Record weight of solids. (note: net weight for non-salt containing fat samples will represent free alpha-cyclodextrin)
16. Subtract free alpha-cyclodextrin amounts determined in 7 above from values determined in steps 14 and 15. Value equals total bound alpha-cyclodextrin.

Method 3A

Micro Method for Foods and Fats with Ionizable Triglycerides, e.g. Phosphatidyl Choline Etc.

1. Weigh out 0.1000 gram of sample each into two clean 20 ml glass scintillation vial with phenolic foil lined cap ("Vial") and record weight.
2. Add Reagent 1, Glyceryl triheptadecanoate, (0.1 mg) into each Vial.

Extraction of Unbound Alpha-Cyclodextrin

3. Add 2.0 ml of Solution A: 0.1 M Acetic Acid with 0.7% (w/v) KCl.
4. Heat Samples at 25° C. for 60 minutes with sonication.
5. Cool sample to room temperature.
6. Centrifuge one aqueous sample at 5000×g. Use the other aqueous sample as described in 9 below.

7. Filter 1 ml of the centrifuged sample supernatant with 0.45 micrometer nylon filter. Inject on to HPLC molecular sizing column. Determine quantity of alpha-cyclodextrin by integrating peak at approximately 32 minute retention time. Quantify total cyclodextrin relative to a response factor developed from a standard curve of pure cyclodextrin. (Note: The retention time will vary depending on volume of HPLC system. The retention time for a given system should be determined by calibration using a standard of pure cyclodextrin)

Extraction of Fat and Bound Alpha-Cyclodextrin

8. Add 10.0 ml of 2:1 Chloroform:MeOH. Seal cap tightly. Incubate at 95° C. for 1 hour with constant shaking at 250 rpm.
9. Focus organic and aqueous phase by centrifuging for 10 min at 5000 rpm separating the organic phase from the aqueous phase.
10. Withdraw bottom layer (chloroform:MeOH) from the vial with a 10 ml gas tight syringe, avoiding the aqueous layer during the draw. Transfer to a clean flask and dry down.
11. Resolubilize sample from 11 above with appropriate amount of chloroform (0.5 to 0.9 ml). Transesterify using Alltech MethPrep II (Alltech Associates, Inc., Deerfield, Ill. 60015, USA) or sodium methoxide. Alternatively, saponify samples.
12. Silanate samples (optional for glycerol and sterol determination) and inject on to GC with FID detector or Mass Spec detector (Hewlett Packard Model 5970 MSD; Agilent Technologies Palo Alto, Calif. 94303 USA) to quantify or determine the amount or level of sterol related compounds that are found in sample.

Determination of Total (Bound+Unbound) Alpha-Cyclodextrin

13. Centrifuge the isolated aqueous layer from 11 above at 5000×g for 10 min.
14. Filter 1 ml of the centrifuged sample supernatant with 0.45 micrometer nylon filter. Inject on to HPLC molecular sizing column. Quantify total cyclodextrin relative to a response factor developed from a standard curve of pure cyclodextrin.
15. For Pure Fat Samples Only: Weigh remainder of supernatant sample into tared flask. Evaporate moisture to dryness. Record weight of solids. (note: net weight for non-salt containing fat samples will represent free alpha-cyclodextrin)
16. Subtract free alpha-cyclodextrin amounts determined in 8 above from values determined in steps 15 and 16. Value equals total bound alpha-cyclodextrin.

Experimental Design

Male Wistar rats, 125-150 g in initial weight, 10 per group, were fed one of four diets. The diets were modifications of the AIN-93G diet [Reeves, PG (1997) Components of the AIN-93 Diets as Improvements in the AIN-76A Diet, *J. Nutr.* 127:838 S-841S], and thus was a purified diet. All diets were modified to contain 15% fat by weight, wherein the fat comprised 50% $^{14}$C-triolein, an unsaturated fat that is a triglyceride of oleic acid, and 50% $^{3}$H-tripalmitin, a saturated fat that is a triglyceride of palmitic acid. The diets were as follows:

| Diet Ingredients | Diet 1<br>AIN-93G<br>Negative Control<br>(g) | Diet 2<br>AIN-93G + 5%<br>Chitosan<br>Positive Control<br>(g) | Diet 3<br>AIN-93G + 5%<br>Cyclodextrin<br>Free Form<br>(g) | Diet 4<br>AIN-93G + 5%<br>Cyclodextrin<br>Complexed w/fat<br>(g) |
|---|---|---|---|---|
| Cornstarch | 693.96 | 693.96 | 693.96 | 693.96 |
| Casein | 400 | 400 | 400 | 400 |
| Dextrinized Cornstarch | 230.45 | 230.45 | 230.45 | 230.45 |
| Sucrose | 174.6 | 174.6 | 174.6 | 174.6 |
| Alpha Dextrin | 0 | 0 | 100 | 99.75 |
| Complexed Alpha Dextrin | 0 | 0 | 0 | 0.25 |
| Cellulose | 100 | 0 | 0 | 0 |
| Chitosan | 0 | 100 | 0 | 0 |
| Tert-BHT | 0.028 | 0.028 | 0.028 | 0.028 |
| Oil Mix: | | | | |
| Palm Oil | 140 | 140 | 140 | 140 |
| Corn Oil | 150 | 150 | 150 | 150 |
| [3H]-Triolein | 5 | 5 | 5 | 0 |
| [14C]-Tripalmitin | 5 | 5 | 5 | 0 |
| Complexed [3H]-Triolein | 0 | 0 | 0 | 5 |
| Complexed [14C]-Tripalmitin | 0 | 0 | 0 | 5 |
| Total Oil Mix | 300 | 300 | 300 | 300 |
| AIN93G Mineral Mix | 70 | 70 | 70 | 70 |
| AIN93G Vitamin Mix | 20 | 20 | 20 | 20 |
| L-Cystine | 6 | 6 | 6 | 6 |
| Choline Bitartrate | 5 | 5 | 5 | 5 |
| Total Ingredients | 2000.038 | 2000.038 | 2000.038 | 2000.038 |

Note that Diet 3 comprised the AIN-93G diet containing 5% α-cyclodextrin (replacing cellulose), which was added in the free unhydrated form as provided by the manufacturer (unhydrated ACD contains approximately 10% w/w moisture). Diet 4 comprised the AIN-93G diet containing 5% hydrated α-cyclodextrin (replacing cellulose), mixed with the radiolabeled fat prior to incorporation into the diet.

The animals were fed their respective diets for 7 days. A two day fecal fat collection was made during days 6 and 7 to allow for a conventional fecal fat determination (i.e. fat extraction with acidified chloroform:methanol). The animals were then fasted overnight, and presented with a 4 g meal of their respective diets containing $^{14}C$-triolein and $^{3}H$-tripalmitin incorporated into the diet. A fecal collection was begun four hours later, and continued until the animals were taken. Twelve hours later, the rats were killed and the small and large intestinal tracts removed. Contents of the stomach, small intestine, cecum, and colon as well as the small intestinal mucosa were collected and freeze-dried. The dried contents and mucosa were mixed by pulverization and a weighed aliquot solubilized with tissue solubilizer in a liquid scintillation vial. After solubilization, the solution was neutralized with glacial acetic acid (to eliminate chemiluminescence), scintillation cocktail added, and the vials counted in a liquid scintillation counter using a dual label counting algorithm.

Results

The effect of the diets on excretion of radiolabeled triolein and tripalmitin is shown in FIG. 1. In this study, excretion is defined as all radiolabel present in the cecal contents, colon contents, and feces. Excretion is calculated in this manner as there is no absorption of triacylglycerols in the large intestine; thus, any radiolabel present in the cecal or colon contents cannot be absorbed and is thus destined to be excreted. For tripalmitin, variance differs by size of mean. To correct for this, data were transformed by $\log_{10}$ prior to statistical analysis. As can be seen, there was a dramatic difference in how the α-cyclodextrin affected excretion of the two radiolabeled triacylglycerols. α-Cyclodextrin added directly to the diet had no affect on triolein excretion, whereas complexed α-cyclodextrin slightly but significantly increased it. In contrast, both α-cyclodextrin added to the diet and the complexed α-cyclodextrin dramatically increased tripalmitin excretion. Chitosan, which is known to increase fecal fat excretion in rats, significantly increased excretion of both triolein and tripalmitin, but in approximately equal proportions.

To further illustrate the selective nature of α-cyclodextrin on triacylglycerols excretion, the ratio of tripalmitin to triolein is shown in FIG. 2. The ratio was calculated using the values in FIG. 1, which represent the amount of radiolabel excreted as a proportion of the amount of radiolabel consumed. As shown, the ratio of excretion of tripalmitin to triolein with feeding of chitosan is approximately 1, and does not differ from the ratio in rats fed the basal diet. In contrast, α-cyclodextrin added to the diet and even more so the complexed α-cyclodextrin favored tripalmitin excretion, thus illustrating the highly selective action of α-cyclodextrin on triacylglycerol excretion. That is, excretion of the saturated fat tripalmitin was dramatically favored over excretion of the monounsaturated fat triolein.

FIG. 3 shows the distribution along the gastrointestinal tract of the tripalmitin radiolabel. For cecal contents, colon contents, and feces, variance differs by size of mean. To correct for this, data were transformed by log 10 prior to statistical analysis. It appears that chitosan may move through the GI tract at a faster rate than does the α-cyclodextrin. This may be due to the granular nature of the chitosan, which most likely offers a greater physical presence than the α-cyclodextrin, allowing intestinal contractions to move the chitosan through the tract more quickly.

The results of the present study indicate that dietary α-cyclodextrin does indeed increase fat excretion. It should be noted that in this study we cannot distinguish between excretion of triacylglycerol or its fatty acid hydrolysis product; therefore, when speaking of excretion of a triacylglycerol, it should be understood that the excretion could in fact be the triacylglycerol, the fatty acid, or some combination thereof.

This study additionally shows that α-cyclodextrin is tremendously selective towards tripalmitin. Thus, α-cyclodextrin has no or only a modest effect on increasing triolein excretion but a dramatic effect on increasing tripalmitin excretion.

All patents, patent documents, and publications cited herein are incorporated by reference as if individually incorporated. Unless otherwise indicated, all parts and percentages are by weight and all molecular weights are weight average molecular weights. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A method of reducing the effective caloric content of a fat-containing food product comprising:
   a) identifying a food product wherein at least about 25% of the effective caloric content is contributed by a saturated fat;
   b) providing a saturated fat complexed with a solubilized alpha cyclodextrin by
      i) solubilizing alpha cyclodextrin in a solvent;
      ii) then mixing a saturated fat composition with the solubilized cyclodextrin to complex at least about 30% of the saturated fat with a solubilized alpha cyclodextrin; and
   c) preparing the food product of step a) using the saturated fat complex of step b);
wherein at least about 30% of the saturated fat present in the food product has been complexed with a solubilized alpha cyclodextrin.

2. The method of claim 1, wherein the weight ratio of alpha cyclodextrin to saturated fat is from about 1:100 to about 10:100.

3. The method of claim 1, wherein the alpha cyclodextrin is solubilized by water.

4. The method of claim 1, wherein at least about 25% of the cyclodextrin in the composition is bound to the fat.

5. The method of claim 1, wherein the saturated fat is from a fat or oil selected from palm oil, palm kernel oil, coconut oil, lard, tallow, hydrogenated oils, and derivative fractions.

6. The method of claim 1, wherein the saturated fat is from a fat or oil selected from palm oil, palm kernel oil, and coconut oil.

7. A method of reducing the amount of saturated fat capable of being metabolized by the body relative to unsaturated fat in a fat-containing food product comprising:
   a) identifying a food product wherein the total fat content comprises at least about 30% saturated fat component, and the food product additionally comprises an unsaturated fat component;
   b) providing a saturated fat complexed with a solubilized alpha cyclodextrin by
      i) solubilizing alpha cyclodextrin in a solvent;
      ii) then mixing a fat composition comprising at least about 30% saturated fat component, and additionally comprising an unsaturated fat component with the solubilized cyclodextrin to preferentially complex at least about 30% of the saturated fat with a solubilized alpha cyclodextrin; and c) preparing the food product of step a) using the saturated fat complex of step b);

wherein at least about 30% of the saturated fat present in the food product has been complexed with a solubilized alpha cyclodextrin and a major portion of the unsaturated fat present in the food product has not been complexed with a solubilized alpha cyclodextrin.

8. The method of claim 7, wherein substantially none of the unsaturated fat present in the food product has been complexed with a solubilized alpha cyclodextrin.

9. The method of claim 7, wherein the weight ratio of alpha cyclodextrin to saturated fat is from about 1:100 to about 10:100.

10. The method of claim 7, wherein the saturated fat is from a fat or oil selected from palm oil, palm kernel oil, coconut oil, lard, tallow, hydrogenated oils, and derivative fractions.

11. The method of claim 7, wherein the unsaturated fat is from a fat or oil selected from corn oil, cottonseed oil, safflower oil, soybean oil, sunflower oil, canola oil, olive oil, and fish oil.

12. A method of preparing a fat composition comprising saturated fat and unsaturated fat wherein the amount of saturated fat capable of being metabolized by the body is reduced, the method comprising:

a) providing a fat composition comprising at least about 30% saturated fat component, and additionally comprising an unsaturated fat component;

b) providing a cyclodextrin composition comprising solubilized alpha cyclodextrin; and c) mixing the fat composition and the cyclodextrin composition to preferentially complex at least about 30% of the saturated fat present in the fat composition with a solubilized alpha cyclodextrin.

13. The method of claim 12, wherein the saturated fat is from a fat or oil selected from palm oil, palm kernel oil, coconut oil, lard, tallow, hydrogenated oils, and derivative fractions.

14. The method of claim 12, wherein the unsaturated fat is from a fat or oil selected from corn oil, cottonseed oil, safflower oil, soybean oil, sunflower oil, canola oil, olive oil, and fish oil.

15. A fat composition comprising a) at least about 30% saturated fat component; and b) an unsaturated fat component;

wherein at least about 30% of the saturated fat present in the fat composition is complexed with a solubilized alpha cyclodextrin.

16. The composition of claim 15, wherein the saturated fat is from a fat or oil selected from palm oil, palm kernel oil, coconut oil, lard, tallow, hydrogenated oils, and derivative fractions, and the unsaturated fat is from a fat or oil selected from corn oil, cottonseed oil, safflower oil, soybean oil, sunflower oil, canola oil, olive oil, and fish oil.

17. A food product comprising a fat composition of claim 15.

* * * * *